Sept. 20, 1932.  B. C. GOSS  1,878,492
PROTECTIVE DEVICE, CONSISTING OF A GAS GUN
Filed Feb. 17, 1932  5 Sheets-Sheet 1
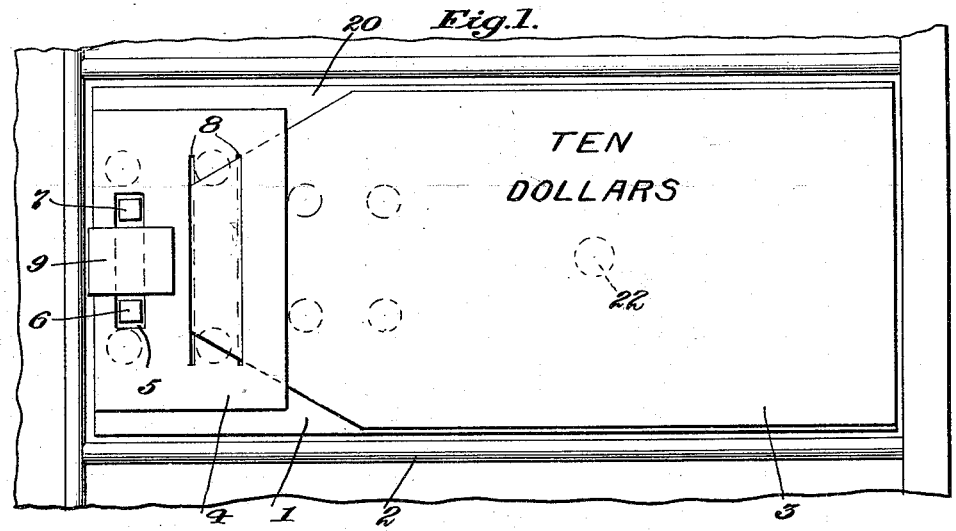
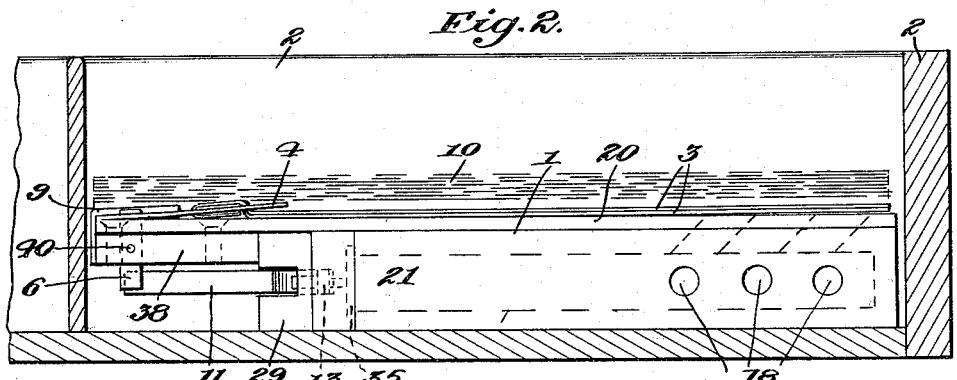
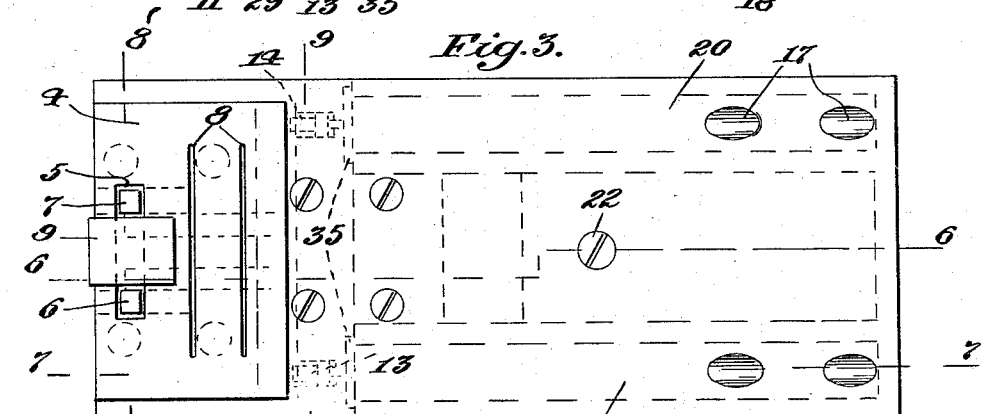
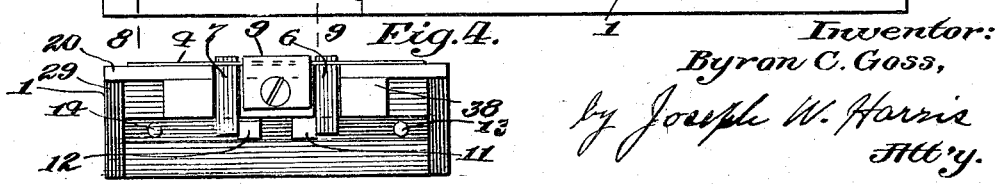
Inventor:
Byron C. Goss,
by Joseph W. Harris
Att'y.

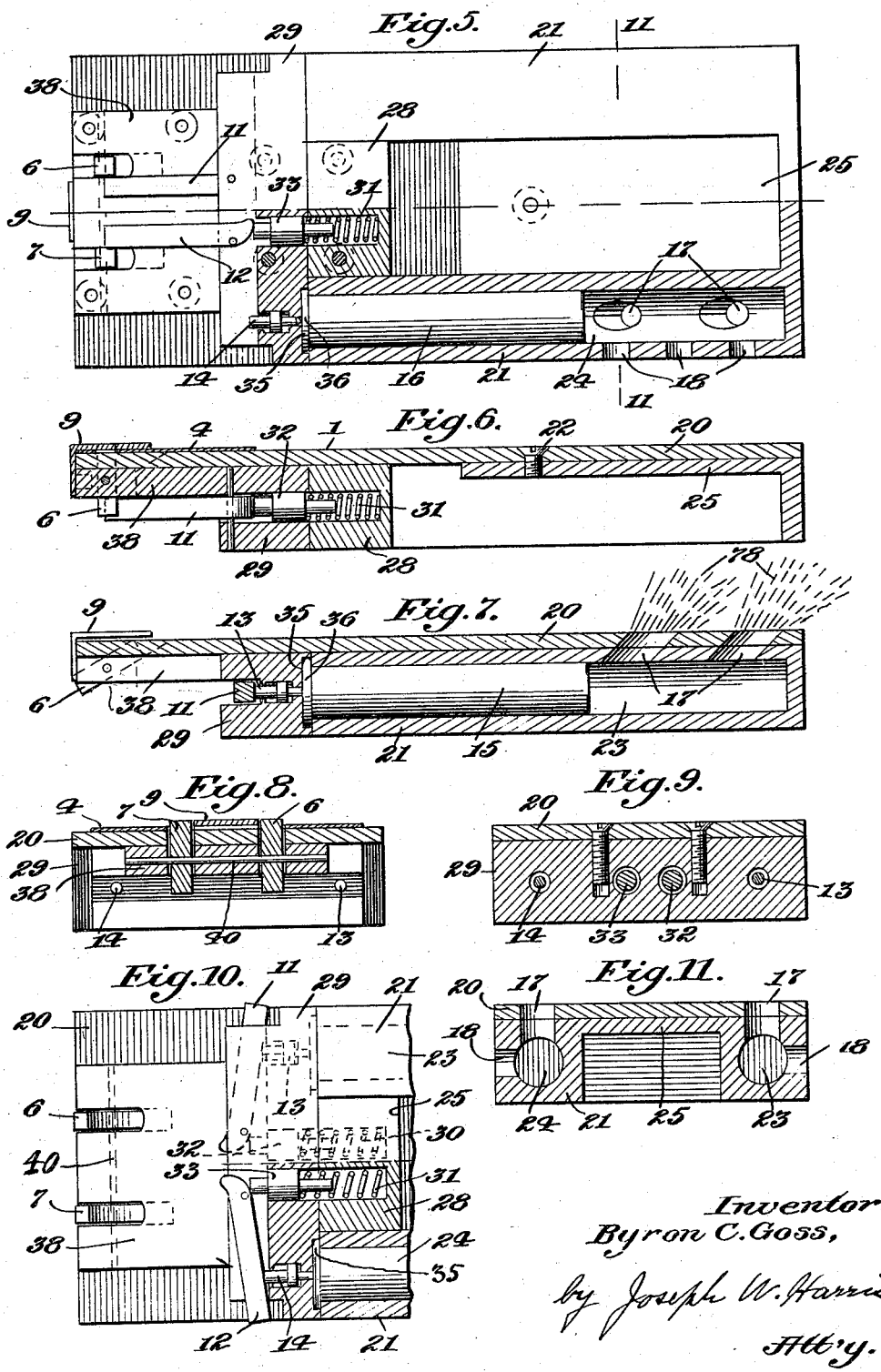

Sept. 20, 1932.  B. C. GOSS  1,878,492
PROTECTIVE DEVICE, CONSISTING OF A GAS GUN
Filed Feb. 17, 1932  5 Sheets-Sheet 3
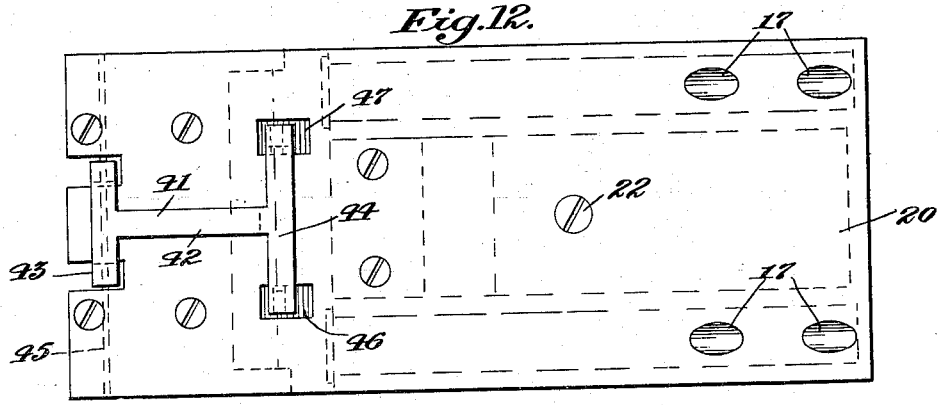
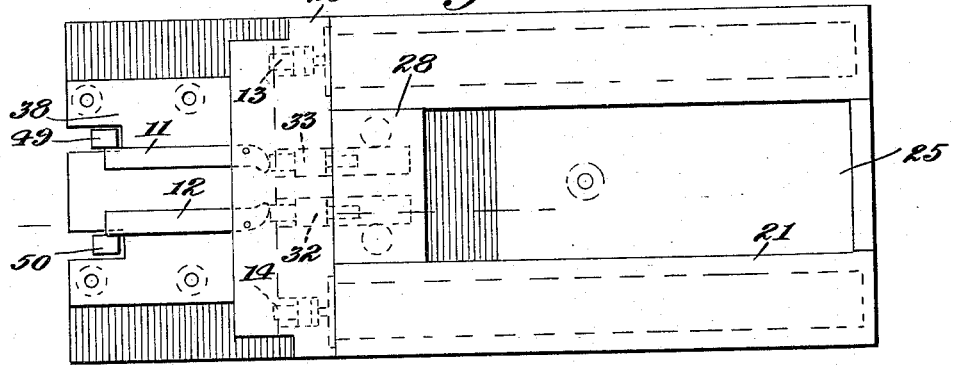
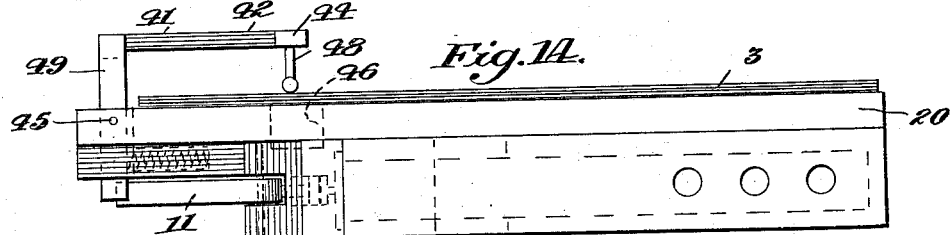
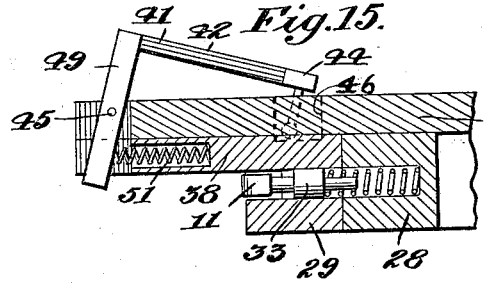
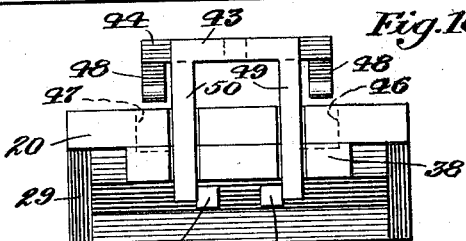
Inventor:
Byron C. Goss,
by Joseph W. Harris
Att'y.

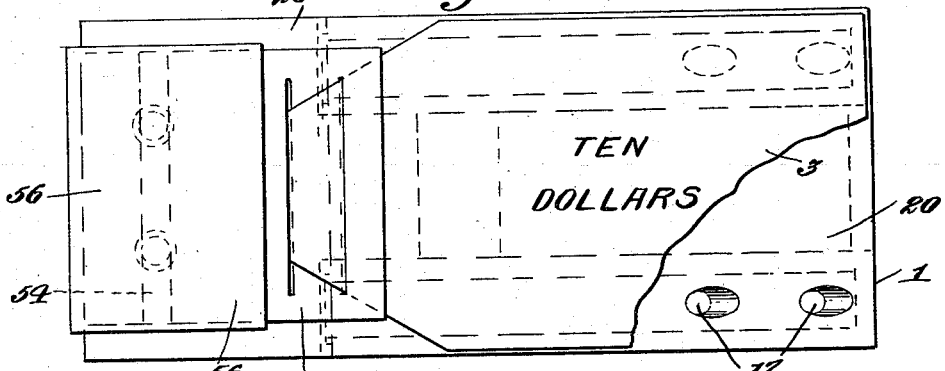
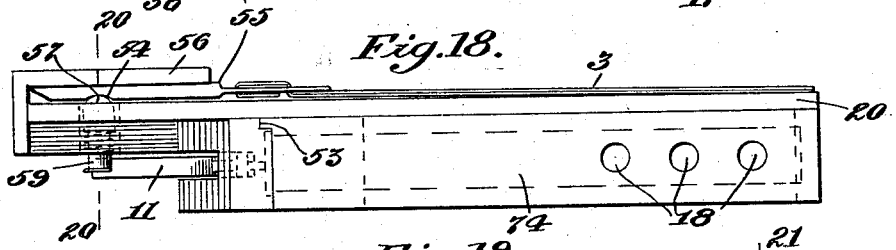
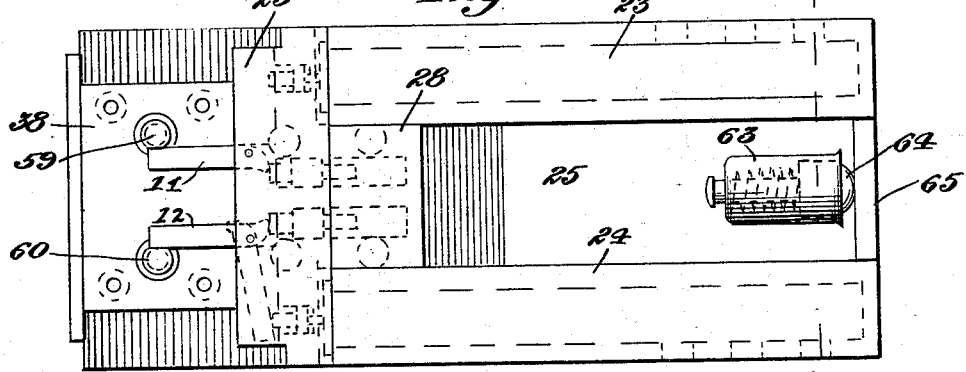
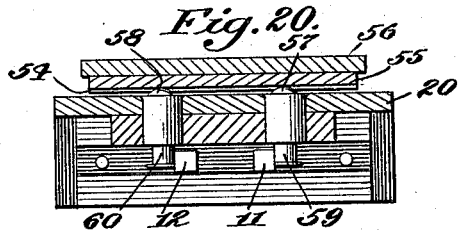
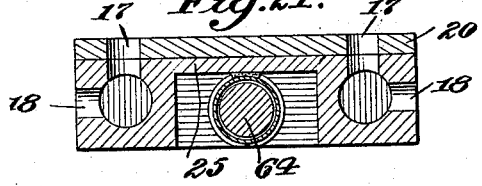
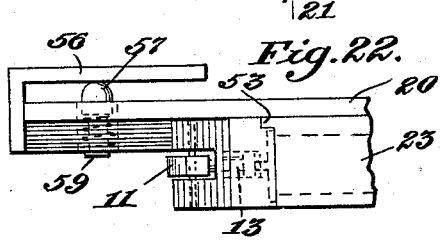

Sept. 20, 1932.  B. C. GOSS  1,878,492
PROTECTIVE DEVICE, CONSISTING OF A GAS GUN
Filed Feb. 17, 1932  5 Sheets-Sheet 5
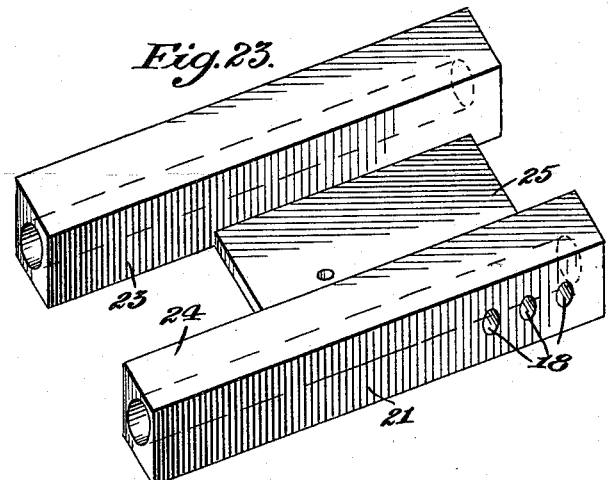
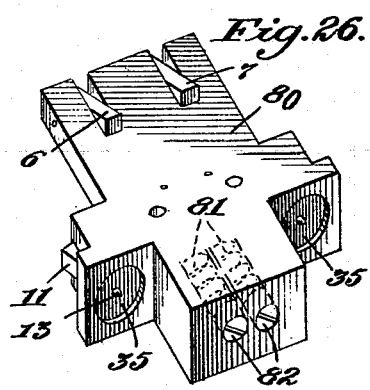
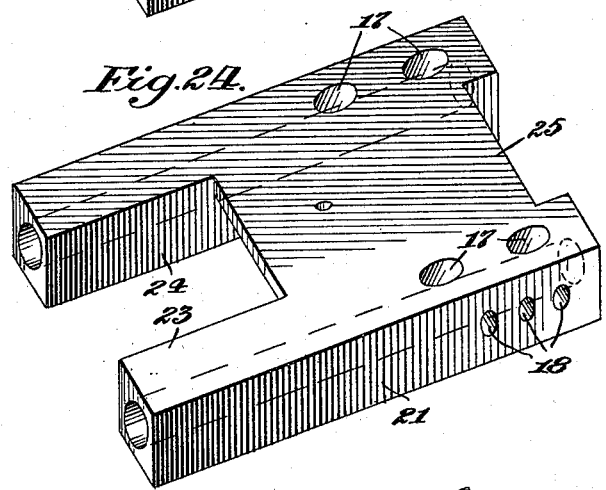
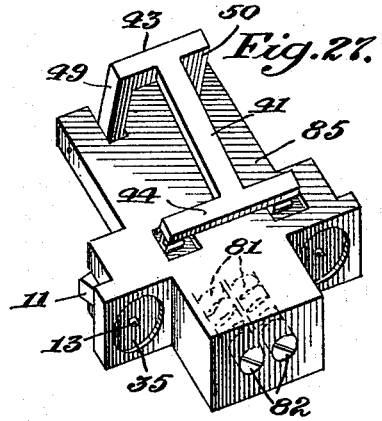
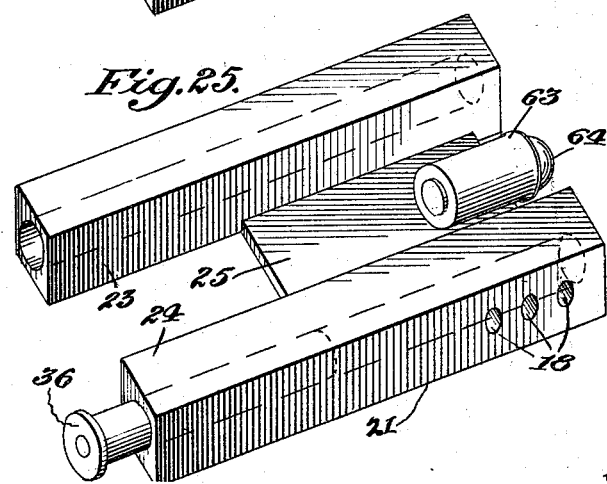
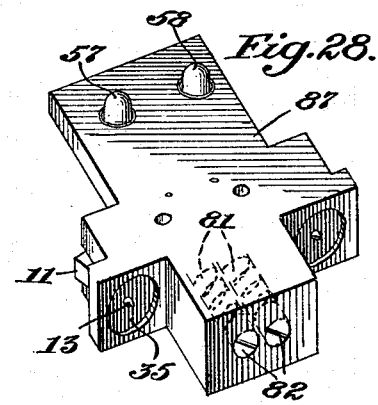
Inventor:
Byron C. Goss,
by Joseph W. Harris
Att'y.

Patented Sept. 20, 1932

1,878,492

UNITED STATES PATENT OFFICE

BYRON C. GOSS, OF CLEVELAND, OHIO

PROTECTIVE DEVICE, CONSISTING OF A GAS GUN

Application filed February 17, 1932. Serial No. 593,654.

This invention relates to cash drawer protective devices, such as a special type of disabling gas gun, of the class adapted to protect paper money, etc., and which may be placed in cash drawers, or other money receptacles, and which is adapted to discharge cartridges or other explosive devices that deliver blasts of disabling and irritating gases, of the "tear" gas type when the paper money is removed and the cartridges or other explosive devices are discharged.

An object of the invention is to provide a protective device, such as a special type of disabling gas gun, which may be placed in cash registers, money boxes, and similar money receptacles, and which is constructed to releasably engage, or clamp, or hold paper money bills, papers, etc., the protective device being in the "cocked" position when the bills or papers are in place, and is immediately discharged upon the withdrawal of the engaged bills or papers.

A further object is to provide a protective device such as a special type of disabling gas gun, of the above class which is adapted to discharge a disabling and irritating gas of the "tear" gas type, the device having angular discharge ports so as to discharge the disabling and irritating gas at the person unlawfully removing the money bills or papers, which removal releases the hammer, and fires the disabling and irritating gas.

Other objects of the invention will be apparent to those skilled in the art upon reading the specification.

Many stores, offices, and other business places where cash transactions are made, have been robbed by bandits or others entering the store and forcing open the cash register and removing the money bills.

Accordingly, the aim of the invention is to provide a protective device such as a special type of gas gun of the character described herein, which detachably holds money bills or other papers, in such a manner that the withdrawal of the bills or the papers will automatically discharge blasts of disabling and irritating gases in the face of the bandit robbing the cash drawer, thereby completely disabling him, and enabling his capture before the active robbery is consummated. Several modifications of a practical protective device or gas gun are described and illustrated herewith.

In the accompanying drawings,

Fig. 1 shows a top view of a broken cash drawer with one type of the protective device or gas gun therein, with a representation of a paper purported to be a ten dollar bill attached to a bill holder, and the bill holder placed in the device;

Fig. 2 is a view of a longitudinal section of a broken cash drawer with a side view of one type of a protective device or gas gun therein, with money bills attached to said device, and with an additional quantity of money bills or papers placed thereon, and also showing a trigger engaged;

Fig. 3 is a top plan view of the protective device with the bill holder in place, but not containing any money bills, and also showing the angular discharge ports on the upper surface of the device, which surface is normally covered with the money bills;

Fig. 4 is a left end view of the protective device with the bill holder in place, and showing the hammers engaged;

Fig. 5 is a bottom view of the protective device partly in elevation and partly in section showing a cartridge in one of the cartridge barrels, and also showing the angular discharge ports from a cartridge barrel, and also showing the hammers engaged;

Fig. 6 is a view of a longitudinal section on the line 6—6 of Fig. 3, showing a trigger engaged, and also showing a hammer plunger with its actuating spring, and also showing a bill holder without money bills;

Fig. 7 is a view of a longitudinal section on the line 7—7 of Fig. 3 showing a hammer released and against a firing pin, and also showing a cartridge in a barrel, and showing blasts of disabling and irritating gases issuing from the angular discharge ports;

Fig. 8 is a view of a transverse vertical section on the line 8—8 of Fig. 3, showing mounted levers in a slot in one type of bill holder;

Fig. 9 is a view of a transverse vertical section on the line 9—9 of Fig. 3;

Fig. 10 is a broken view partly in section of the left end of the protective device, corresponding to Fig. 5, with the hammers released;

Fig. 11 is a view of a transverse vertical section on the line 11—11 of Fig. 5, showing the angular discharge ports;

Fig. 12 is a top plan vew of a modification of the protective device, in which money bills are to be held by a spring pressed arm, and showing the angular discharge ports from the cartridge barrel;

Fig. 13 is a bottom view of the modified protective device shown in Fig. 12 with parts in dotted lines, and showing the hammer engaged;

Fig. 14 is a side plan view of the device shown in Figs. 12 and 13, showing a hammer engaged, and money bills or papers held by the spring pressed arm;

Fig. 15 is a broken view of the left end of Fig. 14, showing the money bills removed with the spring controlled arm depressed, and the hammer released;

Fig. 16 is an end view from the left, showing the hammer engaged, of the modification shown in Figs. 12, 13, and 14;

Fig. 17 is a top plan view of a further modification of the protective device, with a bill holder and a representation of a ten dollar attached thereto, the money bill being torn at the lower right hand corner to illustrate the angular discharge ports of one of the cartridge barrels;

Fig. 18 is an edge view in elevation of the modification shown in Fig. 17, with the bill holder in place, and money bills or papers attached thereto, and a hammer engaged by a spring pressed plunger;

Fig. 19 is a bottom plan view showing parts in dotted lines of the modification shown in Fig. 17, and showing the hammers engaged, and also showing in elevation a spring controlled engaging means;

Fig. 20 is a view of a vertical transverse section on the line 20—20 of Fig. 18;

Fig. 21 is a view of a vertical transverse section on the line 21—21 of Fig. 19;

Fig. 22 is a broken view of the left end of Fig. 18, with the bill holder removed, the spring plungers up, and one hammer in the released position;

Fig. 23 is an inverted view of an integral barrel piece in perspective, showing the cartridge barrels united by an integral web, that may be used on any of the modifications of the protective device shown herein;

Fig. 24 is a view in perspective of the barrels and web in the proper position for attachment to the top plate;

Fig. 25 is an inverted view in perspective of a barrel piece with the spring plunger engaging means, as shown in Fig. 19, also showing a cartridge partly inserted in one of the barrels;

Fig. 26 illustrates in perspective a modified integral hammer block which may be used in any of the modifications shown in Figs. 1 to 11 inclusive.

Fig. 27 illustrates in perspective a modified integral hammer block, which may be used in the modification shown in Figs. 12 to 16 inclusive; and Fig. 28 illustrates in perspective a modified integral hammer block which may be used in the modification shown in Figs. 17 to 22 inclusive.

In Figs. 1 and 2, the protective device or gas gun 1 is shown within the broken cash drawer 2, the device 1 being shown with a representation of a ten dollar bill, or other paper 3, attached to or clamped in without mutilation a bill holder 4, which latter is provided with a slot 5 to receive the ends of the levers 6, 7, and with slits 8 through which the folded ends of one or more money bills 3 are passed as shown in Fig. 2; after attaching the bills to the bill holder 4, the bill holder is slipped under the spring clip 9, and positioned to engage the upper ends of the sears 6, 7, as shown in Fig. 2. As shown in Figs. 1 to 11 inclusive, a top plate 20 is attached to the cartridge holder 21 by a screw 22. The cartridge holder 21 may consist of a casting having two barrels 23, 24, united by a web 25, one type of which is illustrated in Figs. 23 and 24. Below the top plate 20, and cooperating with the cartridge holder 21 is the hammer element consisting of the parts comprising a spring holder 28, and the hammer support block 29; the spring holder 28 contains springs 30, 31, and plungers 32, 33, Fig. 10; the springs 30 and 31 pressing the plungers 33, 34, against the hammers 11, 12; the hammer support 29 also contains firing pins 13, 14, which discharge the cartridges when said firing pins are struck by the release hammers 11, 12, upon the actuation of the protective device 1. In front of the hammer support 29, is the support 38 for the sears 6, 7, mounted on the pivot 40, Figs. 8 and 10.

In Fig. 26, an integral hammer block 80, is shown in perspective which may be substituted for the block elements 28, 29, 38, shown in Figs. 5, 6, and 10. The modification shown in Fig. 26 is provided with holes in which are placed springs 81, the outer ends of the holes being closed by the screws 82; the springs 81 perform the functions of the springs 30, 31, shown in Fig. 10, in that they maintain under compression cylinders 32, 33, which actuate the hammers 11, 12, of Fig. 10.

To use this modification of the device, the cartridge plate holder 21 is detached from top plate 20, and cartridges 15, 16, inserted in the barrels. The plate 21 is then pressed against the hammer element 29, with the cartridge heads 36 entering the recesses 35, Figs. 5, 10, and the tongue 53 entering the groove in element 29, Fig. 18; the plate 21 is now secured to the top plate 20 by a screw 22, Figs. 3 and 6. The sears 6, 7, are now bent forward as shown in Fig. 7, and hammers 11, 12, are then moved to parallel relation as shown in Figs. 5, 13, and 19, after which the money bill holder 4 containing the money bills, Figs. 1, 2, and 3, of this modification is now pressed under the clip 9, so that the upper end of sears 6 and 7 enter the slot 5 in the money bill holder 4. The money bill holder is then pressed further forward thereby moving the sears 6, 7 so that their lower ends engage the hammers 11, 12, Figs. 2, 4, 5, and 6; this modification of the protective device or gas gun is now in operative condition and may be placed in the cash drawer. An additional number of money bills or other papers may be placed upon the money bills 3, as shown in Fig. 2. When a bandit attempts to rob the cash drawer he will take all the money bills including those indicated at 3, and which latter are attached to the bill holder 4; the withdrawal of the bills 3 will also pull out the bill holder 4 thereby pulling forward the sears 6, 7, as shown partly in dotted lines in Fig. 7, which in turn will release the spring actuated hammers 11, 12, Figs. 5, 6, 7, and 10, the released hammers striking the firing pins 13, 14, Figs. 5, 7, and 10, thereby discharging the cartridges 15 16, Figs. 5, 7, and 10, the cartridges discharging disabling and irritating gases of the "tear" gas type, through the angular openings 17, shown at 78 in Fig. 7, the openings passing through the top of the protective device 1, the gas also passing through openings 18, Figs. 2 and 11, in the sides of the cartridge barrels. The gas which is discharged through openings 17 will be projected in the face of the bandit.

In the modification of the protective device, or gas gun, illustrated in Figs. 12 to 16 inclusive, a pivoted compound arm 41, shown also in perspective in Fig. 27, has an end bar 43 from which depend two bars 49, 50, Figs. 14, 15, and 16, said arm being suitably pivoted at 45 through said bars 49, 50, for example, to the top plate 20, Figs. 12, 14, and 15; the lower ends of bars 49, 50 engage the hammers 11, 12, as illustrated in Figs. 13, 14, and 16, when the protective device is "set"; the end bar 43 is connected to a front bar 44 by the connecting web 42; depending from the front bar 44 are one or more lugs 48, shown in Figs. 14 and 16, which are adapted to fall into suitable cavities 46, 47, Fig. 15, extending through the top plate 20; the depending bars 49 and 50 are resiliently pressed toward the left by two springs, one of which, 51, is shown in Fig. 15. To use this modification, the cartridge holder 21 is charged with cartridges and attached to the top plate 20, the hammers 11 and 12 are moved to their parallel relation as shown in Fig. 13, and the front bar 44 raised thereby engaging the hammers 11 and 12 by the depending bars 49 and 50, Figs. 13, 14; a space is thereby provided between the bottom ends of lugs 48 and the top surface of the plate 20, Figs. 14 and 16, within which space may be placed money bills 3 shown in Fig. 14; upon the withdrawal of the bills 3, the springs 51 will press forward the depending bars 49 and 50, Fig. 15, releasing the hammers 11 and 12 which thereupon strike the firing pins 13 and 14 as described above under Figs. 1 to 11 inclusive, and discharging the cartridges shown in Figs. 5 and 7; the operation is otherwise the same as that described above on Figs. 1 to 11 inclusive.

The modified hammer block 85, shown in perspective in Fig. 27 may be substituted for the separate hammer block elements shown in Figs. 13, 14, and 15; this modification also contains the springs 81 and screws 82 described above under Fig. 26.

In the modification illustrated in Figs. 17 to 22 inclusive, one or more money bills 3 are folded and placed in the money holder 55, which latter may be provided with a groove 54, Fig. 18, the money holder is adapted to be slipped under the engagement plate 56, Figs. 18, 20, and 22. The cartridge barrels 23, 24, Fig. 19, also shown in inverted perspective in Fig. 25, are united by a web 25, the latter supporting at the right hand end a spring controlled lock catch 63, containing a rounded plunger 64, which is adapted to engage a groove or recess (not shown) in the end piece 65, which end piece is rigidly secured to the top plate 20, and securely holds the cartridge barrel member. In using this modification the cartridge barrels are charged with cartridges and attached to the plate 20 by the catch 63; the hammers 11, 12, are moved to parallel relation, as shown in Fig. 19, and the money holder 55, to which the bills have been attached, is pressed under the plate 56, Fig. 18, thereby depressing the spring actuated plungers 57, 58, and their pins 59, 60, releasably engaging the parallel hammers 11, 12; or a plurality of bills may be inserted under the plate 56, sufficient in number to depress the plungers 57, 58; upon the withdrawal of the bills 3 attached to the bill holder 55, the spring pressed plungers 57, 58 are raised thereby releasing the hammers 11 and 12, and firing the cartridges as described under Figs. 1 to 11 inclusive.

The modified hammer block 87 shown in Fig. 28, may be substituted for the separate hammer block elements shown in Figs. 18, 19, 20, and 22; this hammer block 87 is also provided with the springs 81 and screws 82 as described above under Fig. 22.

I claim:—

1. A cash drawer protective device consisting of a gun, means to detachably clamp papers on said device, hammer actuating mechanism, hammers, said means comprising hammer holding and releasing mechanism, and said triggers released upon the withdrawal of said papers.

2. A cash drawer protective device consisting of a gun, comprising means to detachably clamp papers, hammers, said means constructed to releasably engage said hammers in the operative position when papers are in the device, said hammers automatically disengaged from said means upon the removal of said papers.

3. A cash drawer protective device comprising a movable element adapted to detachably hold papers, a hammer, means adapted to clamp a disabling gas generating charge, said hammer adapted to be detachably engaged in the operative position by said element, said hammer adapted to discharge said gas charge upon its disengagement from said element.

4. A cash drawer protective device comprising means adapted to detachably clamp papers, hammers, means to forcibly actuate said hammers, a movable element adapted to releasably engage said triggers in the operative position, means to hold a disabling gas charge, said hammers adapted to be actuated upon its disengagement from said element and "fire" said gas charge.

5. A cash drawer protective device consisting of a gun, means on said device to clamp papers, hammer mechanism, hammers, cartridge barrels, said hammer mechanism provided with recesses to receive the heads of cartridges, means to secure said barrels to said gun, said hammers actuated by the withdrawal of said papers.

6. A cash drawer protective device consisting of a gun, spring actuated hammers, a movable member, one portion of said member adapted to releasably clamp papers, another portion of said member constructed to engage said hammers, firing pins, said triggers adapted to strike said firing pin when released from said member.

7. A cash drawer protective device consisting of a gun, spring actuated hammers, a movable spring pressed arm, one portion of said arm adapted to releasably clamp papers on said device, the other portion of said arm constructed to engage said hammers, firing pins, said hammers adapted to strike said firing pin when released from said arm.

8. A cash drawer protective device consisting of a gun, a clip to which papers may be clamped, means on said device to receive said clip, hammer engaging means, hammers, said clip adapted to engage said hammer engaging means and hold said hammers in the operative position, said hammers adapted to be disengaged and "fire" said gun when said clip is withdrawn.

9. A cash drawer protective device comprising a clip to detachably clamp papers, a hammer engaging element, said element adapted to be releasably engaged by said clip, a hammer, said hammer adapted to be held in an operative position by said element, a cartridge barrel, said barrel adapted to hold a cartridge in an operative position, said hammer adapted to be released by the withdrawal of said clip and fire said cartridges.

10. A cash register protective device consisting of a gun, means to clamp papers on said device, hammer mechanism, hammers, gun barrels, said barrels provided with discharge ports at an angle to the axis of said barrels, whereby when the gun is "fired" the discharge from said barrel will issue in an angular direction through said ports.

11. A cash drawer protective device consisting of a gun, comprising means to detachably clamp papers, hammers, said means constructed to engage said hammers in the operative position, said hammers adapted to be released upon the removal of said papers, said gun provided with cartridge barrels, said barrels having inclined discharge ports, whereby when the gun is "fired" the discharge from said barrels will be directed in an angular direction.

12. A cash drawer protective device comprising means adapted to detachably clamp papers, a hammer, said hammer adapted to be releasably engaged in the operative position when papers are detachably placed in said device, a disabling gas generating charge, said gas charge adapted to be discharged by said hammer upon its disengagement by the removal of said papers.

13. A cash drawer protective device consisting of a gun, plungers, said plungers adapted to clamp papers on said device, hammer actuating mechanism, hammers, said plungers adapted to hold said hammers in the operative position when papers are in said device, said plungers adapted to release said hammers when said papers are withdrawn.

14. A cash drawer protective device consisting of a gun, spring actuated hammers, spring actuated plungers, a stop above the top of said plungers, the upper ends of said plungers adapted to releasably engage inserted matter placed between their tops and said stop, the other ends of said plungers adapted to releasably engage said hammers when the inserted matter engages the tops of said plungers, said hammers adapted to be released when said inserted matter is withdrawn.

In testimony whereof I hereby affix my signature.

BYRON C. GOSS.